June 18, 1968 R. J. DITLINGER 3,388,615
BUSHINGS FOR TIE-BARS
Filed April 6, 1967
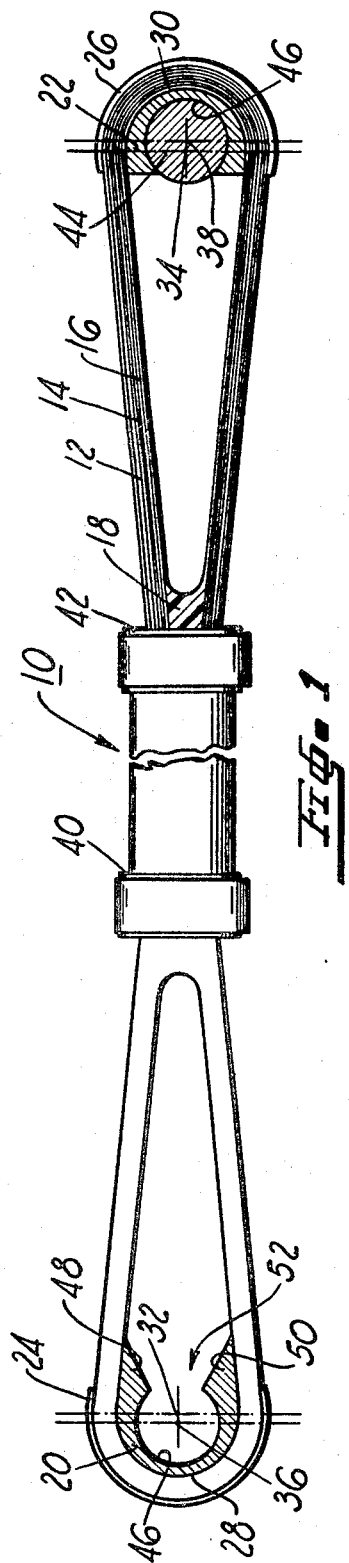
INVENTOR.
RICHARD J. DITLINGER
BY
ATTORNEY United States Patent Office 3,388,615
Patented June 18, 1968

3,388,615
BUSHINGS FOR TIE-BARS
Richard J. Didinger, South Bend, Ind., assignor to The Bendix Corporation, a corporation of Delaware
Filed Apr. 6, 1967, Ser. No. 629,020
10 Claims. (Cl. 74—579)

ABSTRACT OF THE DISCLOSURE

A bushing or end fitting for a closed loop type of connecting device such as a tie-bar comprised of flexibly integrated filaments formed as bands and laminated around at least two such end fittings, which end fittings are provided with a load bearing surface that is eccentrically formed about the axis of the tie-bar with respect to an aperture of the bushing in which pin means are utilized to unite the coupling thus formed to surrounding structure.

Summary

Tie-bars in accordance with the principles of this invention have found increasing use in helicopter rotor systems for uniting a rotor arm to a rotor blade. It has been observed that there are forces within the rotor system that tend to rotate the bushings within the laminations of the flexibly integrated filaments aforementioned. Furthermore it has been observed that there are forces tending to transmit bending loads in either the rotor arm or the rotor blade via the bushing to the flexibly integrated filament bands which tend to buckle the laminations to deteriorate the flexible integration of the filaments and eventually permit filament contact one with the other that will create localized stresses reducing the service life of the coupler. It is a principal object of this invention to eliminate these problems that have been observed and more particularly, to provide a bushing whose bearing surface for the lamination of flexibly integrated filaments is eccentrically formed with respect to the load carrying surface of the aperture of the end fitting to which the pins unite the coupling means to surrounding structure.

Drawing description

FIGURE 1 is a plan view of a coupling incorporating two modifications of end fittings designed in accordance with the principles of this invention, one of which is shown at the extreme right end of the closed loop coupling and the other of which is shown at the extreme left end;

FIGURE 2 is a plan view of a section adjacent the end of a coupler incorporating a still further modification in accordance with the principles of this invention; and FIGURE 3 is a plan view of an end section of a coupler incorporating yet another modification of this invention.

Detailed description

With reference now to FIGURE 1 there is shown a coupler 10 comprised of a plurality of filaments 12, 14 and 16 flexibly integrated by a flexible adhesive 18 which are wrapped around and preferably bonded to central bodies 20 and 22 between upper and lower flanges, one of which, namely lower flanges 24 and 26, being shown. The central bodies have a load bearing surface 28 and 30 formed as a semi-circle about centers 32 and 34. Each of end fittings or bushings, as they may be termed is also provided with apertures drilled on the centers 36 and 38, also along the axis for the coupler 10. As will be explained hereinafter, it is necessary to make the distance between the centers 36 and 38 greater than that between the centers 32 and 34 on the axis of the coupling 10.

The lamination of the bands of flexibly integrated filaments 12, 14 and 16 converge as they leave each of the bushings to narrow down in the center of the coupling and they are held in this attitude by circumferential wrapping of flexibly integrated filaments about rings 40 and 42.

As seen, with regard to the center body 22, and which is also to be expected to be utilized with the center body 20, a pin 44 is inserted through the aperture to snuggly fit the load carrying or transferring surface 46 of the center bodies 20 and 22. This pin, as will be appreciated by those skilled in the art to which this invention relates, will unite the ends of the tie-bar to surrounding structure.

If desired, noting the extreme left center body 20 as viewed in FIGURE 1, the center body may be formed with axially projecting sides 48 and 50. In any case, the center bodies 20 and 22 are machined so that the apertures are open to the inside of the coupling 10, as at 52. This opening of the aperture is along a chord thereof which is of substantially less dimension than the diameter of the aperture in order that the pin 44 may not be removed through the openings 52.

If desired, and with regard to FIGURE 2, elastomeric blocks 54 and 56, which may also be formed by a substantially less flexible and perhaps even a resin type adhesive is bonded to the machine face 56 of the center body 58 to eliminate the weight of the formation utilizing the extensions 48 and 50, while providing a similarly dimensioned axial surface bond between the lamination 60 and the center body 58 as it encircles the load bearing surface 62. Again, with regard to the center bodies 20 and 22, an aperture is provided through the center body 58 to have a load carrying surface 64 whose center 66 is displaced from the center 68 of the load bearing surface and toward the load bearing surface.

With respect now to FIGURE 3, the end fitting or bushing is shown in full with the upper flange 70 over the center bodies such that the load bearing surface is shown in the dash line 72. Pin 74 is shown in place with a wedge type clip 76 that may be frictionally held between the converging sides 78 and 80 of the endless lamination about the end fittings, or bonded to the innermost layer of bands of flexibly integrated filaments forming this endless lamination. This clip is provided witth a radiused surface 82 that abuts the pin 74 adjacent the opening in the end fitting to not only transmit side loadings in the sides 78 and 80 to the pin 74, but also prevent the pin 74 from becoming dislodged from the aperture in the bushing. It should also be noted that with the use of this clip 76 that some compressive load carrying ability is provided to a coupling such as the coupling 10 of FIGURE 1.

The eccentric location of the center for the aperture with respect to the center for the load bearing surface provides means to set up a torque about the load carrying surface or retention pin aperture centerline that tends to realign the bushing. In other words the perpendicular distance from the longitudinal centerline of the coupler 10 to the tangency point on the wire bearing surfaces tends to shorten on one side and lengthen on the other due to the misalignment of the end fittings from whatever reason.

Having fully described an operative construction of my invention, it is now desired to set forth the intended protection sought by these Letter Patent as follows:

I claim:
1. A coupling having layer of flexibly integrated filament bands about end fittings comprising:
   flange means above and below said bands; and
   an apertured body connecting said flange means having a bearing surface operatively connected to said bands and an eccentrically located load transferring surface provided by the aperture with respect to said bearing surface such that a bending moment creates torque in said bushing to maintain the alignment of the end fittings.

2. A coupling according to claim 1 comprising two such end fittings on a longitudinal axis of said coupling with a center of the apertures being a greater distance apart than a center for the bearing surface.

3. A coupling according to claim 1 wherein said apertured body is flattened on one side along to open said aperture opposite said bearing surface.

4. A coupling according to claim 1 wherein said apertured body to either side of an opening through said body to said aperture extends for a predetermined distance along an innermost layer of said bands and is bonded thereto.

5. A coupling according to claim 3 and further comprising blocks operatively connected to said apertured body to either side of the open aperture and to an innermost layer of said bands to provide a surface of increased axial dimension for transmitting bending moments from said bands to said end fitting.

6. A coupling according to claim 5 wherein said blocks are of a similar substance as that which flexibly integrates said filaments in said bands.

7. A coupling according to claim 3 wherein said bands converge as they leave said end fittings and a metal clip is wedged between side portions of said bands and overlies the open aperture of said body.

8. End fitting means for an endless connecting means including a closed loop means encircling said end fitting means, which end fitting means comprises:

a central body having a bearing surface of a predetermined dimension from an axis for said connecting means, said body also having an eccentric aperture with respect to said bearing surface to provide a large load transferring surface for said end fitting means; and means to integrate said closed loop means to said bearing surface.

9. End fitting means according to claim 8 further characterized to comprise two central bodies on the axis of said connecting means with said bearing surfaces being semi-circular and having centers which are of less distance apart on said axis than centers of the apertures of said bodies.

10. End fitting means according to claim 8 connected to surrounding structure by pin means wherein said closed loop means comprises flexibly integrated filament bands providing substantial tensile load carrying ability and torsional resilience with the load transferring surface of the aperture serving to align said end fitting means on the axis of said closed loop means whereby a bending moment on said end fittings by misalignment of said pin means is absorbed by said end fitting means.

References Cited

UNITED STATES PATENTS

| 1,475,627 | 11/1923 | Gates | 287—81 |
| 3,228,481 | 1/1966 | Eldred | 64—11 X |
| 3,279,278 | 10/1966 | Eldred | 74—579 |

FOREIGN PATENTS

| 167,934 | 8/1921 | England. |
| 466,305 | 7/1950 | Canada. |
| 1,053,251 | 3/1959 | Germany. |

EDWARD C. ALLEN, *Primary Examiner.*

WAYNE SHEDD, *Assistant Examiner.*